United States Patent

Pasco et al.

Patent Number: 6,064,778
Date of Patent: *May 16, 2000

[54] METHOD AND APPARATUS FOR NEAR REAL-TIME DOCUMENT SKEW COMPENSATION

[75] Inventors: Richard Clark Pasco, San Jose; Sorin Vasile Papuc, Santa Clara, both of Calif.; Pierre-Alain Cotte, Paris, France

[73] Assignee: Primax Electronics Ltd., Taipei Hsien, Taiwan

[ * ] Notice: This patent is subject to a terminal disclaimer.

[21] Appl. No.: 09/131,159

[22] Filed: Aug. 7, 1998

Related U.S. Application Data

[63] Continuation of application No. 08/170,125, Dec. 20, 1993, Pat. No. 5,818,976, which is a continuation-in-part of application No. 08/143,218, Oct. 25, 1993, abandoned.

[30] Foreign Application Priority Data

Jun. 23, 1998 [TW] Taiwan .................................. 87107278

[51] Int. Cl.⁷ .................................................... G06K 9/32
[52] U.S. Cl. ........................................... 382/289; 382/296
[58] Field of Search .................................... 382/296, 289, 382/202, 282, 290, 291; 358/474, 488

[56] References Cited

U.S. PATENT DOCUMENTS

| | | | |
|---|---|---|---|
| 4,620,288 | 10/1986 | Welmers | 364/518 |
| 4,802,229 | 1/1989 | Yamada et al. | 382/296 |
| 4,823,395 | 4/1989 | Chikauchi | 382/48 |
| 4,926,490 | 5/1990 | Mano | 382/289 |
| 4,953,230 | 8/1990 | Kurose | 382/46 |
| 4,980,781 | 12/1990 | Yamamoto et al. | 358/474 |
| 5,027,227 | 6/1991 | Kita | 358/488 |
| 5,086,486 | 2/1992 | Yamada | 382/53 |
| 5,093,653 | 3/1992 | Ikehira | 340/727 |
| 5,191,438 | 3/1993 | Katsurada et al. | 382/296 |
| 5,276,530 | 1/1994 | Siegel | 358/406 |
| 5,373,371 | 12/1994 | Masui | 358/488 |
| 5,455,690 | 10/1995 | Ishikawa | 358/488 |

FOREIGN PATENT DOCUMENTS

| | | |
|---|---|---|
| 0291077 | 11/1988 | European Pat. Off. . |
| 0485051 | 5/1991 | European Pat. Off. . |
| 0441414 | 8/1991 | European Pat. Off. . |
| 0449336 | 10/1991 | European Pat. Off. . |
| 0509549 | 10/1992 | European Pat. Off. . |
| 2025863 | 1/1990 | Japan . |

OTHER PUBLICATIONS

A. W. Paeth, " A Fast Algorithm for General Raster Rotation, " *Graphic Gems.* A.S. Glassner, ed., 1990, pp. 179–195.

"Scanning Time Saved by Ideal's Cadimage/Scan Breakthrough," News Release, Rockville, MD. Jun. 2, 1992.

"Calcomp Introduces Large–Format, Multiplication Scan—plus 17 Four Models Meet Wide Range of Users' Performance Needs," News Release, Scottsdale, AZ, Mar. 26, 1993.

"Kofax Unveils KF–9275 Advanced Document Processor," News Release, Chicago, IL, Apr. 6, 1993.

"Automatic Extraction of Original Features in a Copy Machine," Research Disclosure No. 328, Emsworth, GB, Aug. 1991, p. 594.

"Ideal Releases New Scanning Software," Electronic Imaging Report, v. 2, No. 12, Jun. 12, 1992.

*Primary Examiner*—Yon J. Couso
*Attorney, Agent, or Firm*—Gallagher & Lathrop; David N. Lathrop

[57] ABSTRACT

A document imaging system detects skew and/or size of a document. In one embodiment, a document imaging system generates scanning signals representing the documents, analyxes the scanning signals to detect one more edges of the document before the entire lenght of the document is scanned, establishes a skew angle between the detected edges and a reference orientation, and modifies the scanning signals to compensate for skew while the document is being scanned. In another embodiment, a document imaging system detects one or more edges of a document, defines a polygon having sides substantially congruent with the detected edges, and establishes the size of the document in response to the polygon.

20 Claims, 9 Drawing Sheets

METHOD AND APPARATUS FOR NEAR REAL-TIME DOCUMENT SKEW COMPENSATION

CROSS-REFERENCE TO RELATED APPLICATION

This application is a continuation of U.S. patent application Ser. No. 08/170,125 filed Dec. 20, 1993, now U.S. Pat. No. 5,818,976 which is incorporated by reference in its entirety and which is a continuation-in-part of U.S. patent application Ser. No. 08/143,218 filed Oct. 25, 1993, now abandoned.

TECHNICAL FIELD

The present invention relates in general to optical scanning and image processing, and relates more particularly to a document imaging system which detects skew and/or size/shape of a document image, and for compensation of skew.

BACKGROUND ART

Document imaging technology is used in a growing number of business and other applications such as facsimile or "fax" machine transmissions, optical character recognition (OCR), the digitizing of photographs and artwork, and photocopy machines. In many of these applications, best results are usually obtained if document contents are properly aligned with an optical sensor used to generate an image of the document and if the size and/or shape of the document can be established.

If a document page is misaligned with respect to the optical sensor, the resultant image is similarly skewed. Because the contents of a document page are usually aligned with the page itself, a skewed page usually results in a misalignment with the optical sensor. Misalignment can reduce the amount of data compression achievable by fax machines and can increase the error rate of OCR processes. As a result, the ease with which such systems may be used is impaired because operators must take care to ensure that the medium is reasonably well aligned with the optical sensor.

Skew compensation in optical systems such as those disclosed in U.S. Pat. Nos. 5,027,227 and 5,093,653 are unsatisfactory because they require operator input to establish the "skew angle" or the amount of image rotation required to compensate for skew. A system disclosed in U.S. Pat. No. 4,953,230 does not require operator input, but it relies upon the existence of text or other marks on the page to establish the orientation of the page. Other disadvantages of these systems include requiring large amounts of memory to store the image while the skew angle is established and imposing a considerable delay after scanning before skew is compensated. Furthermore, the skew compensation techniques disclosed in these patents severely distort the image unless the skew angle is small.

In many applications, document images are either transmitted immediately or stored for later use. Transmission-channel bandwidth and storage capacity are required to convey portions of the scanned image outside the edges of the scanned document unless the size/shape of the document can be established. This bandwidth or storage capacity is essentially wasted because this portion of the image does not convey useful information about the contents of the document. It is, therefore, desirable for a document imaging system to establish the size/shape of pages in a document so that the required bandwidth required to transmit, or the storage capacity required to store, a document image is minimized.

A method and a device are needed for automatic skew compensation and for automatic size and/or shape detection.

DISCLOSURE OF INVENTION

It is an object of the present invention to provide automatic skew detection in a document imaging system.

It is an object of the present invention to provide automatic skew compensation in a document imaging system.

It is an object of the present invention to provide skew compensation as a document is scanned, thereby reducing the amount of memory required to store scanning data while skew is compensated and reducing the delay before portions of the deskewed document image can be processed. This is referred to herein as "near real-time" skew compensation.

It is yet another object of the present invention to provide for a document imaging system which establishes the size and/or shape of a scanned document.

These and other objects which are discussed throughout this description are achieved by the invention as claimed.

In accordance with the teachings of one aspect of the present invention, one embodiment of a document imaging system generates scanning signals in response to optical characteristics of a medium such as a sheet of paper against a background with contrasting optical characteristics. Orientation, size and/or shape of the medium are established in response to transitions in the scanning signals corresponding to transitions between contrasting optical characteristics of the medium and the background.

In accordance with the teachings of another aspect of the present invention, one embodiment of a document imaging system generates scanning signals in response to optical characteristics of a medium, records points in response to transitions in the scanning signal corresponding to an edge of the medium, fits a line to the points, establishes a skew angle between the fitted line and a reference orientation, and compensates for skew by modifying the scanning signals as required such that the resultant skew angle is substantially equal to zero.

In another embodiment, a document imaging system establishes a measure of confidence in the line fit by calculating the error between the line and the recorded points, and compensates for skew only if the measure of confidence is sufficiently high.

In yet another embodiment, a document imaging system fits more than one line to points corresponding to more than one edge of the medium, establishes a measure of confidence in the fit of each line, selects the line with the highest measure of confidence, establishes a skew angle between that line and a corresponding reference orientation, and compensates for the established skew angle.

In another embodiment, a document imaging system ensures that the recorded points span a minimum distance before attempting to detect an edge by fitting a line to the points.

In accordance with the teachings of yet another aspect of the present invention, one embodiment of a document imaging system detects one or more points in an image corresponding to one or more edges of a document, establishes a closed contour in response to the one or more points, defines a polygon having sides tangential to the closed contour, and establishes the size/shape of the document in response to the polygon.

In another embodiment, a document imaging system detects the points in a low-pass filtered representation of the image. In yet another embodiment, a document imaging system defines a polygon which is a rectangle.

Features of the various embodiments mentioned above may be modified and/or combined to form other embodiments. Aspects of the present invention and its preferred embodiments may be better understood by referring to the following discussion and the accompanying drawings in which like reference numerals refer to like elements in the several figures. The embodiments set forth in the following discussion and in the drawings are provided by way of examples only and should not be understood to represent limitations upon the scope of the present invention.

MODES FOR CARRYING OUT THE INVENTION

Figure 5:
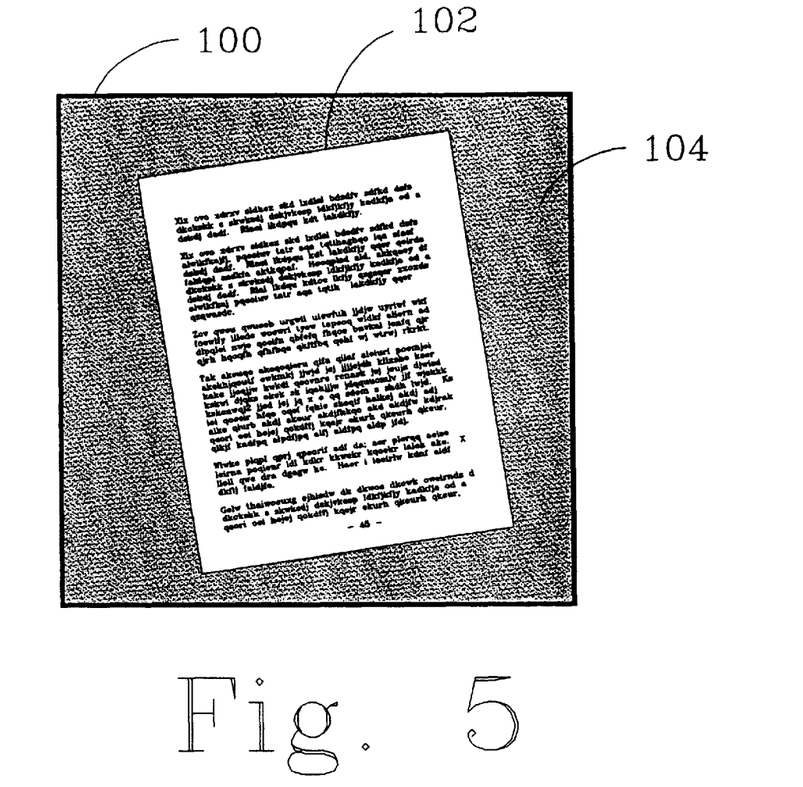
FIG. 5 is a hypothetical graphical representation of a page image.

FIG. 5 is a hypothetical graphical representation of a document image as it might be generated by a document imaging system without skew and size/shape detection and skew compensation. The image within frame 100 comprises page image 102, which is skewed with respect to the frame, and area 104 outside the edges of the page image. Document imaging systems incorporating various aspects of the present invention directed toward skew detection and compensation attempt to generate an image in which page image 102 is oriented with respect to frame 100. Document imaging systems incorporating various aspects of the present invention directed toward size/shape detection attempt to generate an image in which frame 100 is substantially coincident with the edges of page image 102.

Basic Structure

Figure 1:
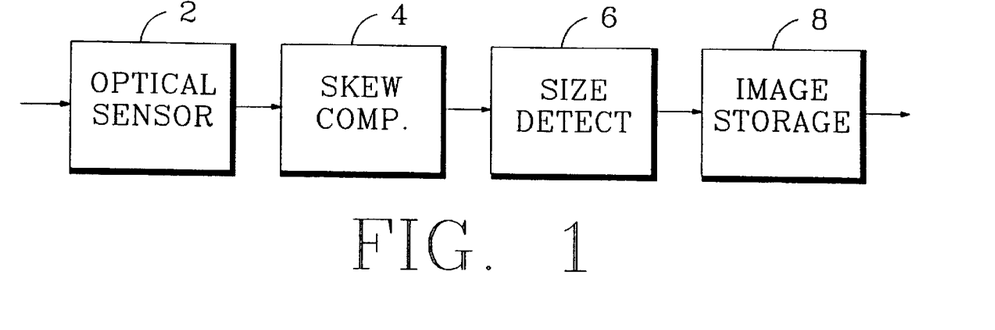
FIG. 1 is a functional block diagram of a document imaging system incorporating various aspects of the present invention.

The basic structure of one embodiment of a document imaging system incorporating various aspects of the present invention is illustrated in FIG. 1. Optical sensor 2 generates scanning signals representing an image of a medium such as a document page. References to "page" herein should be understood to refer generally to a suitable medium carrying information which is printed, written, drawn or otherwise conveyed optically. Skew compensator 4 analyzes the scanning signals, detects and calculates a skew angle between an edge of the page and a reference orientation, and modifies the scanning signals as required such that the resultant skew angle is substantially equal to zero. Size/shape detector 6 analyzes the resulting scanning signals and estimates boundaries in the image corresponding to edges of the page. The portion of the image within the estimated boundaries is stored in image storage 8.

Other embodiments of a document imaging system are possible. For example, an embodiment comprising optical sensor 2, skew compensator 4 and image storage 8 provides for skew detection and compensation. An embodiment comprising optical sensor 2, size/shape detector 6 and image storage 8 provides size/shape detection. Various embodiments of skew compensator 4 and size/shape detector 6 are discussed in more detail below. Image storage 8 is not required to practice any aspect of the present invention but represents a component which uses the image representation passed either by skew compensation 4 or by size/shape detector 6. As an alternative to image storage 8, for example, size/shape detector 6 may pass an image representation to a component for facsimile transmission or for display.

Optical sensor 2 may be implemented in a number of ways using a variety of sensing elements. No particular embodiment is critical to the practice of the present invention; however, a preferred embodiment uses a contact image sensor (CIS) and a mechanism capable of moving the page relative to the CIS. This implementation is generally preferred because of its relatively low cost, small size and ruggedness. Alternative embodiments include flat-bed scanners in which a mechanism moves the sensing element relative to the page and hand-held scanners in which the sensing element is moved by hand relative to the page. In principle other types of sensing elements can be used such as, for example, a linear charge-coupled device (CCD), a two-dimensional CCD array, or an image orthicon tube. If a two-dimensional sensing arrangement is used, the page should be held relatively stationary with respect to the sensing element. Alternatively, a flying spot scanning system can be employed. The present invention contemplates any means for generating a signal which corresponds to a two-dimensional image representation of the page. Either transmissive or reflective optical techniques may be used.

When reflective techniques are used, preferred embodiments incorporate a scanning background with optical characteristics which contrast with the optical characteristics of the pages to be scanned by the optical sensor. For example, if the pages are conventional white sheets of paper, the background may be black or a shade of grey. Grey shading from approximately thirty percent to one hundred percent (black) usually provide sufficient contrast with white sheets of paper. If white and black pages are to be scanned, the background may be an intermediate shade of grey such as fifty percent. If the optical sensor is sensitive to color, the background may be a contrasting color. The background may also comprise a gradation in shading or color, or a pattern of lines, dots, or other shapes of one or more shades and/or one or more colors which contrast with optical characteristics of the pages; the edges of a page can be established by detecting transitions in the scanning signal corresponding to transitions between the background and the page. If the contrast between portions of an edge and the background is not sufficient to allow detection of transitions in the scanning signal, then those portions can be established by interpolating and/or extrapolating information from transitions which could be detected.

In flat-bed scanners, for example, the contrasting background may be provided by a lid or other surface placed over the page to be scanned, or the background may be provided by the absence of a lid or other surface in proximity to the scanned page. In feed-through or roller type scanners, the contrasting background may be provided by the roller. With hand-held scanners, the contrasting background may be provided by a mat or other surface behind the page being scanned. Many other implementations are possible.

Specifications for the optical sensing element are influenced by a variety of design choices including desired image resolution and size of the page to be scanned. If a linear sensing element is used, the relative velocity between the scanning element and the page is another consideration. In one preferred embodiment, optical sensor 2 comprises a CIS with 1728 elements scanning along a line 8.5 inches in length, thereby providing a horizontal resolution of approximately 200 picture elements or "pixels" per inch. The CIS is scanned at a rate of 400 Hz and the page is moved forward approximately 0.005 inches between scans, thereby providing a vertical resolution of approximately 200 samples per inch. The image resolution and scanning speed are mere design choices and are not critical to the practice of the present invention.

Figure 2:
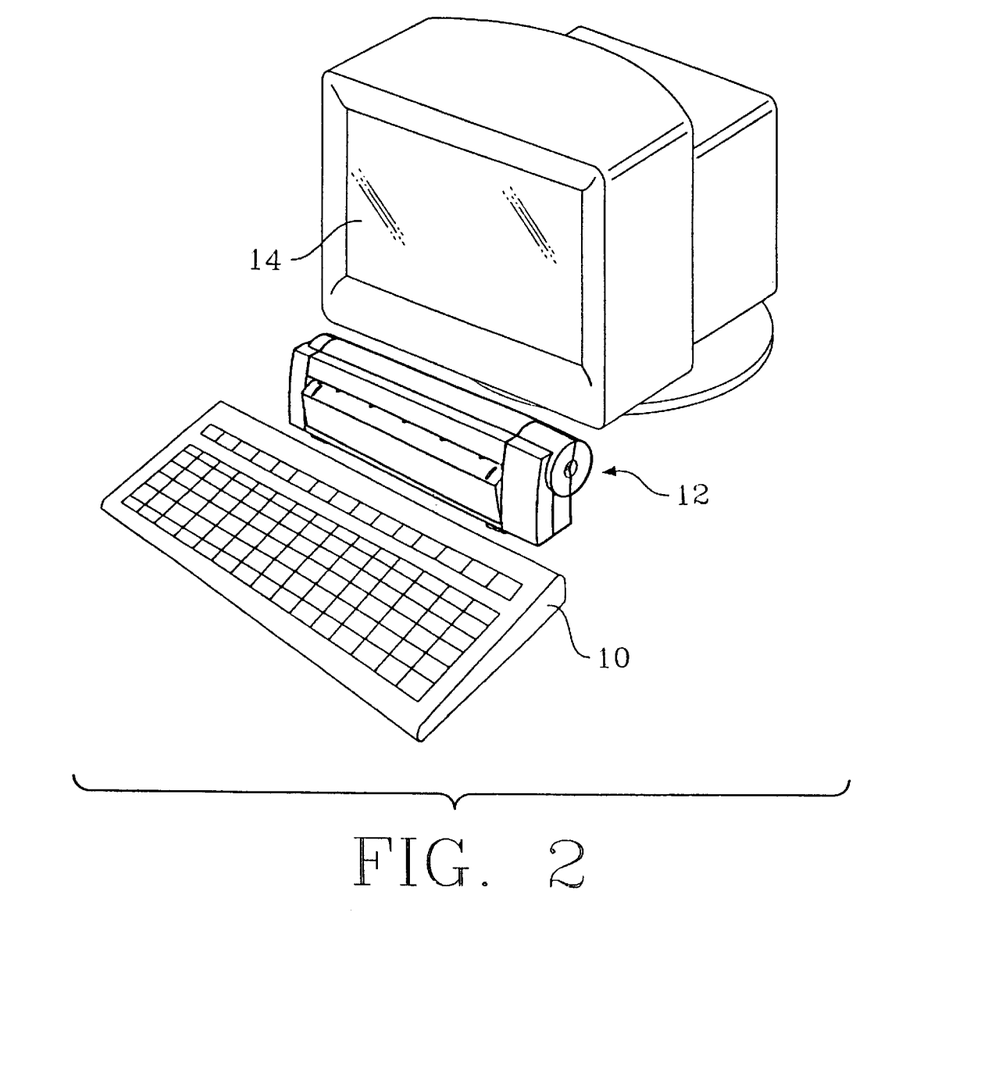
FIG. 2 is a schematic representation of peripheral devices which may used in a computing system which implements a document imaging system.

FIG. 2 provides a schematic representation of keyboard 10, scanner 12 and display 14 used in one embodiment of a microprocessor-based computing system which implements a document imaging system. Scanner 12 represents a device which incorporates optical sensor 2, and may also incorporate skew compensator 4 and/or size/shape detector 6. Functions not performed by scanner 12 may be performed in a host computer, not shown, attached to the peripherals illustrated in FIG. 2. Although it is contemplated that much of the processing described below is implemented by software, some or all of the processing could also be implemented by hardware. The present invention may be implemented by a wide variety of hardware and software combinations.

Skew Detection and Compensation

Figure 3A:
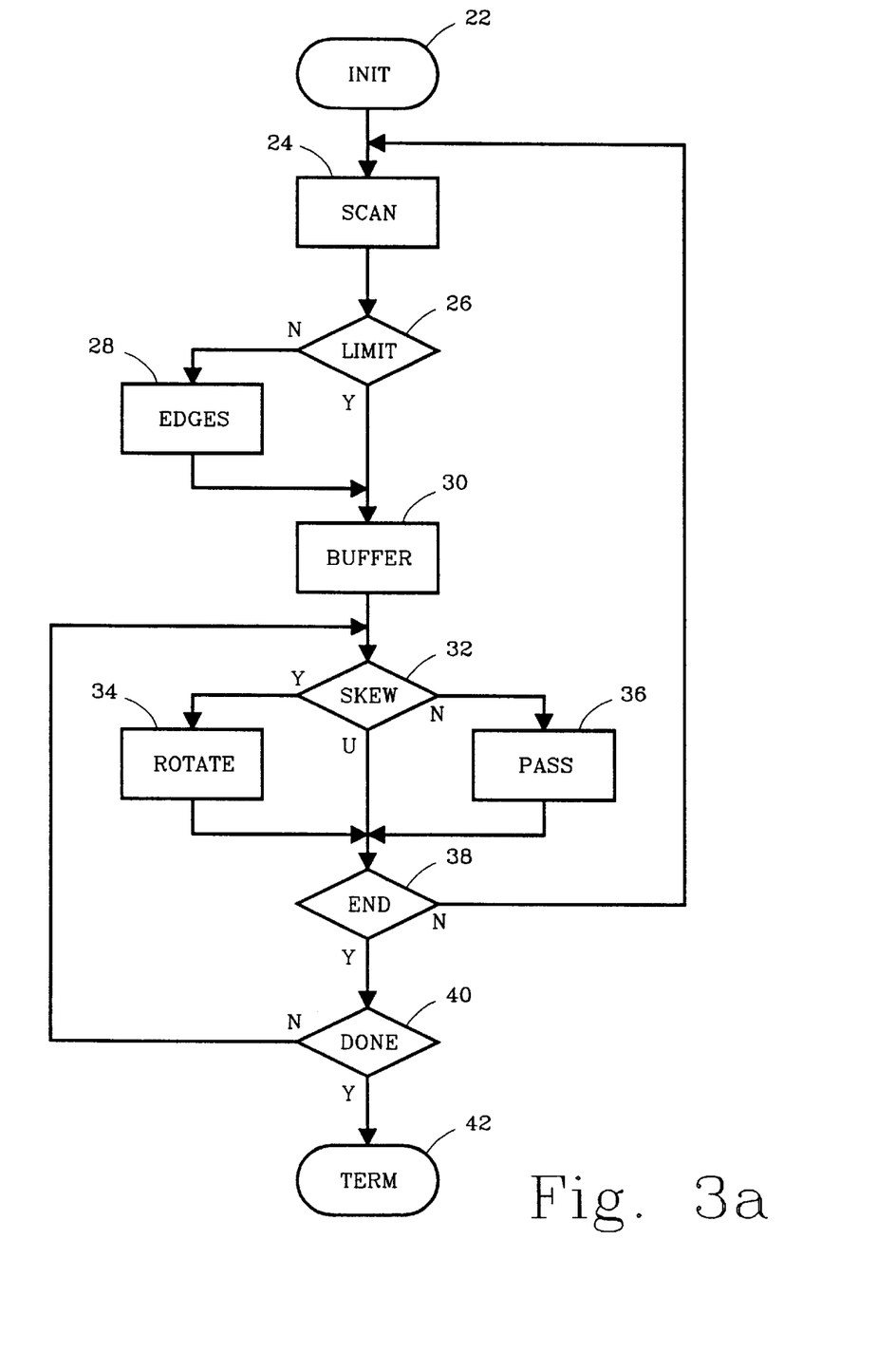
FIG. 3a is a flowchart representing one method of skew compensation according to various aspects of the present invention.

The flowchart in FIG. 3a illustrates steps in one method of skew detection and compensation according to various aspects of the present invention. Many variations are possible. Some of these variations are discussed below. An alternative method is discussed after the first method is described.

INIT 22 ensures that various elements are prepared for the following steps. For example, optical sensor 2 may be placed into a known state to begin scanning a page. In embodiments utilizing software, memory may be allocated and data work areas are set to initial values. In particular, for the embodiment discussed below, initialization includes clearing a buffer of all scanning data and setting indications that a skew angle has not yet been calculated, a scanning limit has not yet been reached, the end of the page has not yet been reached, scanning is not yet done, and no points corresponding to page edges have been recorded.

SCAN 24 provides scanning data in response to scanning signals received from optical sensor 2. Preferably, SCAN 24 receives scanning signals from an optical sensor in increments representing a single line of the image scan so that the amount of memory needed to store the scanning data is reduced. In a preferred embodiment, scanning data comprises binary pixels indicating whether corresponding portions of the scanning signal represent "white" or "black" images. A pixel value equal to one corresponds to a black image and a pixel value equal to negative one corresponds to a white image. These values are convenient choices for the particular non-recursive low-pass filters described below. Other sets of binary values such as one and zero may be used in other embodiments.

In alternative embodiments, scanning data comprises pixels with digital values representing discrete shades of grey or color. The present invention may be used to detect and compensate skew in such grey-scale images; however, edge detection, discussed below, is simplified by using binary-valued pixels. This may be accomplished by comparing the digital values to a threshold to establish binary elements indicating whether the pixel corresponds to a "light" or "dark" image. For ease of discussion, the following description assumes the scanning data comprises binary pixels.

LIMIT 26 establishes a position in the scanning data for a given page after which skew compensation will not be attempted if a skew angle has not yet been established. This feature minimizes the amount of memory required to temporarily store scanning data, and also passes image data to a subsequent process in near real-time even if skew compensation is not possible.

Scanning data is held in a buffer while an attempt is made to calculate the skew angle. If the skew angle is calculated successfully, the scanning data in the buffer and scanning data received subsequently is modified to compensate for skew, and the modified data is passed to a subsequent process. In the embodiment shown in FIG. 1, for example, the subsequent process is size/shape detector 6. If the skew angle cannot be calculated successfully, the data in the buffer and the scanning data received subsequently for this page are passed unaltered to a subsequent process. LIMIT 26 establishes the position in the scan of a given page at which skew angle calculations are abandoned and the buffered data begins to pass unaltered.

Various criteria which may be used to establish this position include, for example, a maximum number of recorded points provided to edge detection, a physical dimension across the page, or maximum size of the buffer available to hold scanning data. In one embodiment using the optical sensor described above, the limit is set at sixty-four scanning lines.

EDGES 28 analyzes scanning data to detect one or more edges of the page and attempts to calculate the angle between one of the edges and a reference orientation. Any reference orientation may be used with the present invention, but common choices are the principal axis of the optical sensing element and a line orthogonal to that axis which is parallel to the plane of the page.

Edge detection may look for one or more edges. For example, edge detection may look only for the left edge of the page, or it may look for the left, top and right edges. Edge detection in one embodiment, described in more detail below, looks for two edges adjacent to a corner of the page which are referred to as a "left" edge and a "right" edge; however, one of these edges usually corresponds to the top edge of the page. The top edge cannot be identified until the skew angle is established.

BUFFER 30 temporarily stores scanning data in the buffer. The size of the buffer required to hold this data is affected by the operation of LIMIT 26, described above.

SKEW 32 inquires whether a skew angle has been successfully calculated for this page. If it has, scanning data in the buffer is processed by ROTATE 34. If it has not and skew compensation is abandoned because the limit set by LIMIT 26 has been exceeded, then scanning data is processed by PASS 36. Otherwise, the scanning data is retained in the buffer and END 38 is performed next. After the skew angle calculation is either successful or abandoned, image data may be passed to a subsequent process in near-real time by either ROTATE 34 or PASS 36.

ROTATE 34 applies a rotational transform to scanning data in the buffer so that an image corresponding to the transformed data is rotated with respect to an image corresponding to the scanning data as received from SCAN 24. The magnitude of the rotation angle is substantially equal to the skew angle calculated by EDGES 28 but is opposite in sign. As a result, the rotational transform compensates for skew. The results of the transform are passed to a subsequent process such as size/shape detector 6.

The center of rotation is not critical to the practice of the invention. In the preferred embodiment, the center is established at one of the upper corners of frame 100 (see FIG. 5). This is described in more detail below.

PASS 36 takes scanning data from the buffer and passes it to a subsequent process without applying a rotational transform. PASS 36 is performed only when attempts to calculate a skew angle have been abandoned.

END 38 inquires whether the end of the scanning data has been reached. If not, SCAN 24 is performed again to obtain additional scanning data.

DONE 40 inquires whether all data in the buffer has been processed. If not, either ROTATE 34 or PASS 36 is performed until the buffer is empty.

TERM 42 performs after all image data corresponding to a page has been passed to a subsequent process. This may include turning off the optical sensor, releasing allocated memory and/or notifying a subsequent process that all image data has been passed.

Edge Detection and Skew Angle Calculation

Figure 3B:
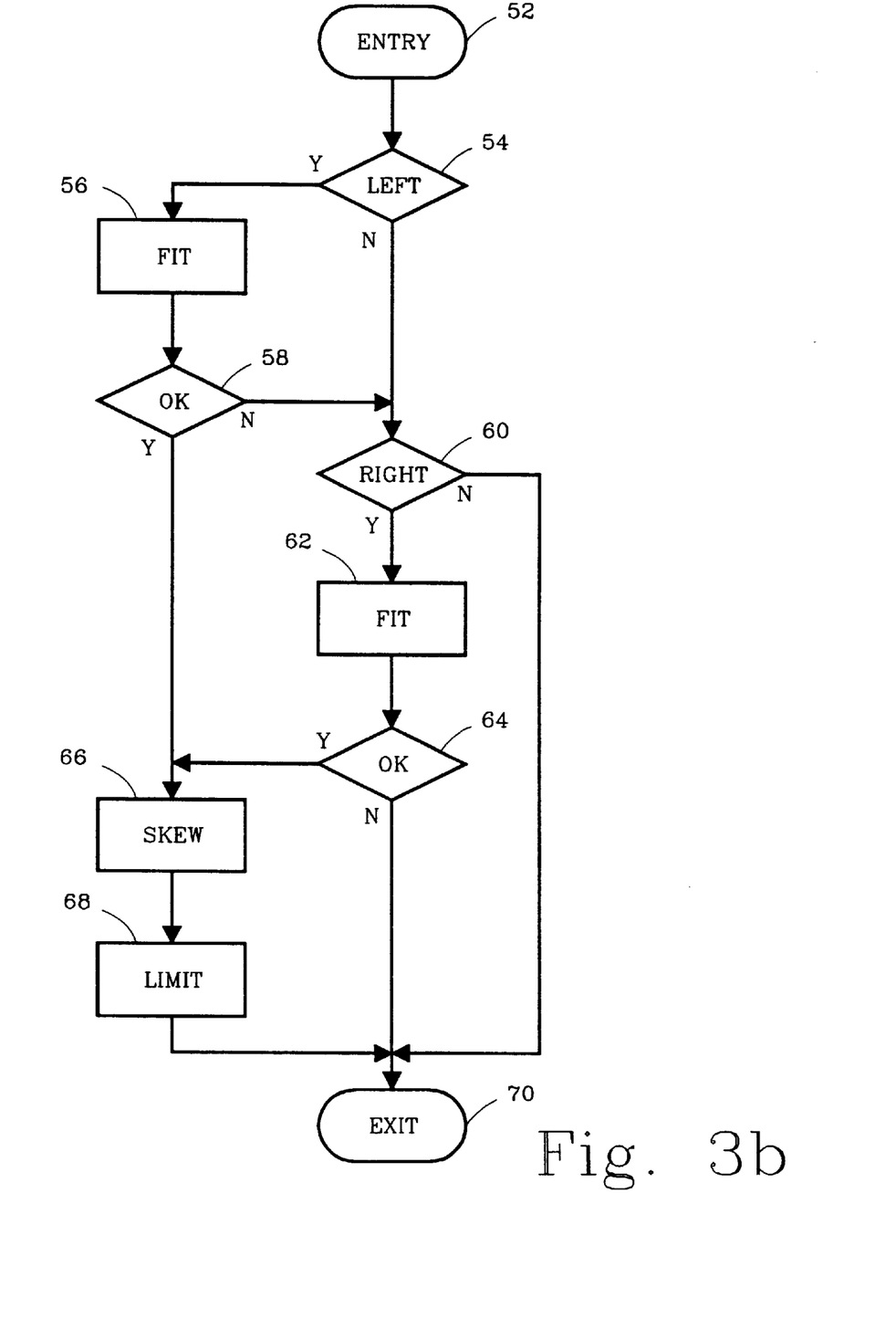
FIG. 3b is a flowchart representing one method of edge detection and skew angle calculation according to various aspects of the present invention.

The flowchart in FIG. 3b provides additional detail of one method to detect edges and calculate a skew angle. Many variations are possible. Some of these variations are discussed below.

In one embodiment, optical sensor 2 scans a page against a black background. The black background provides a high degree of contrast with most sheets of paper. A black background is not required to practice the present invention, but a background with some optical characteristic that contrasts with the pages is preferred.

If a contrasting background is not used, other methods may be used to provide an indication of the edges. For example, a set of electromechanical switches or optical switches can be arranged in a manner to sense the location of one or more edges of each page in conjunction with the scanning by the optical sensor. The position information can be included in the scanning data by multiplexing it with the signals generated by the sensing element.

In one embodiment, edge processing analyzes scanning data to record points which correspond to two edges of the page. In general, these edges are adjacent to a corner of the page image because the page is seldom aligned exactly with the optical sensor. As mentioned above, in this embodiment the two edges are referred to as "left" and "right" edges even though one of these edges usually corresponds to the top edge of the page image. Referring to FIG. 5, for example, the page is skewed approximately 10 degrees in a counter-clockwise direction. The upper right corner of the page is the first part of the page which is scanned by optical sensor 2. The edge to the left of this corner is actually the top edge of the page, but it is referred to as the "left" edge during edge detection processing. If the page were skewed by a greater amount, say fifty-five degrees counter-clockwise for example, edge detection would identify the edge adjacent to the right margin of the page as the top edge.

If the top edge of the page happens to be perfectly aligned with the optical sensing element, the two detected edges are not adjacent to one corner but instead are adjacent to opposite corners of the top edge. This unlikely occurrence does not pose any difficulty for the method described below.

In one embodiment, edge detection analyzes a low-pass filtered representation of the scanning data to minimize the adverse effects of factors such as noise in the optical sensor, small chips of paper within the view of the sensor, and random marks on the page. The filter may be recursive or non-recursive, analog or digital, implemented by a variety of techniques. No particular filter implementation is critical to the practice of the invention; however, one embodiment comprises two 10-tap non-recursive filters. In one filter, used to detect the "left" edge, the first five adjacent taps have a coefficient equal to one and the last five adjacent taps have a coefficient equal to negative one. The second filter, used to detect the "right" edge, is a mirror of the first filter. The characteristics of the filter are influenced by a number of factors such as sensitivity of the optical sensor and the technique used to fit a line to the recorded points.

ENTRY 52 receives one or more lines of scanning data as input for edge detection. In preferred embodiments, one line of scanning data is received.

LEFT 54 analyzes the scanning data and establishes whether any transition in the data represents a "left" edge. In one embodiment, this is accomplished by examining the scanning data from left to right, looking for a transition from black to white. If such a transition is found, the horizontal location of the transition is saved in a set of recorded "left" points.

FIT 56 establishes the best fit of a straight line to the set of recorded "left" points and establishes a measure of confidence in the fit. In one embodiment, a method which minimizes the mean squared error between the line and the recorded points is used to fit the line, but any method of fitting lines may be used. The mean squared error may also be used as a measure of confidence in the fit.

In practice, the location of some of the recorded "left" points will deviate significantly from the actual location of the "left" edge. These so-called "bad" points may be handled in any of several ways. In one embodiment, a given point is excluded from the set of recorded "left" points if the distance between the given point and the fitted line is greater than 1.2 pixels. This distance is obtained from the length of an orthogonal projection from the point to the line. As an alternative, the bad points may be kept in the set of recorded "left" points and the following inquiry is modified accordingly.

OK 58 inquires whether the measure of confidence in line fit is sufficient to establish the location of the "left" edge. In one embodiment, the measure of confidence is the number of points in the set of recorded "left" points after all bad points are excluded. In one embodiment, a minimum of thirty recorded points is required to establish an edge.

Figure 6:
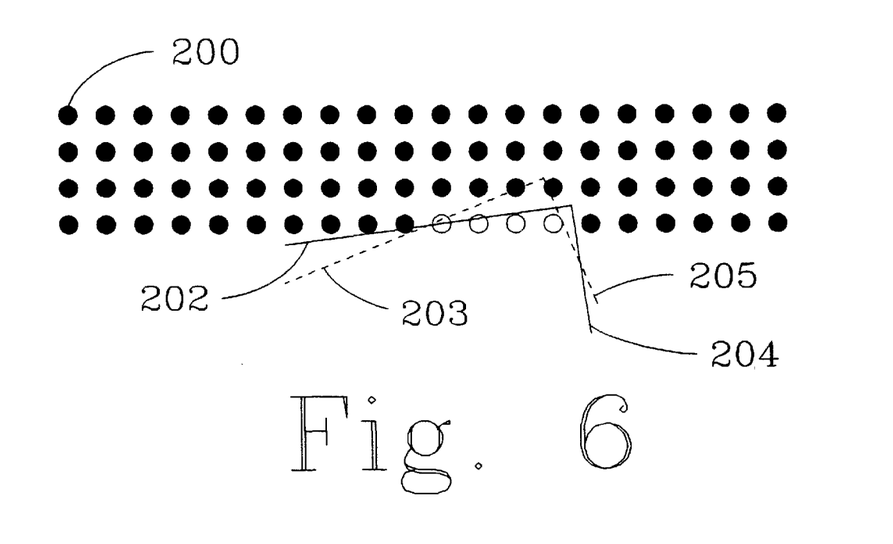
FIGS. 6–8 are hypothetical representations of magnified views of image pixels in the vicinity of a page corner.

In theory only two recorded points are required to define a line but, because of various sources of uncertainty in actual practice, more recorded points are required to define the line confidently. This uncertainty is illustrated in FIG. 6 which provides an enlarged view of a portion of an image. Each dot such as dot 200 represents one pixel. The colored dots correspond to "black" pixels and the uncolored dots correspond to "white" pixels. The number of pixels processed is generally very large, but only a small number of pixels are shown for convenience. The pixels shown in the figure were generated by scanning a page having orthogonal edges defined by lines 202 and 204. The same set of pixels could also be generated from a scan of a page having orthogonal edges defined by lines 203 and 205. The large difference between the two sets of lines represents the high degree of uncertainty in establishing an edge using only a few recorded points.

Figure 7:
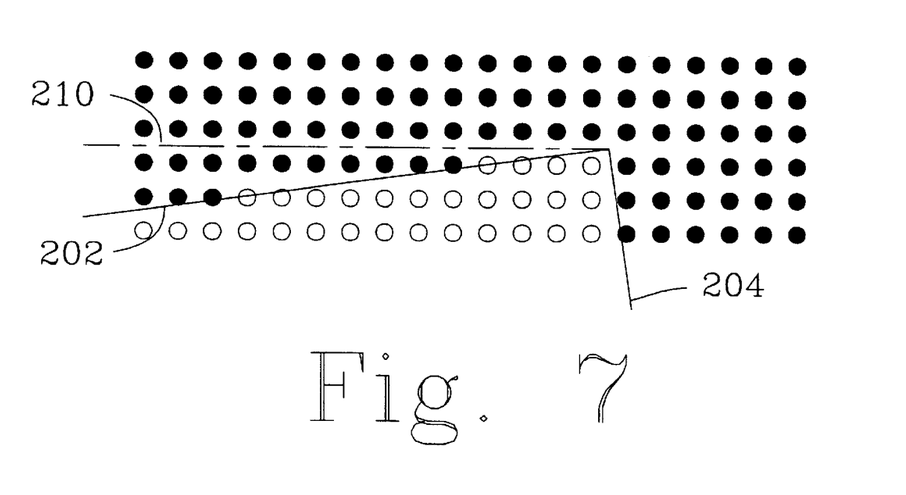

FIG. 7 provides a similar view to that shown in FIG. 6. Addition scanning lines provide additional recorded points for each edge, thereby reducing the uncertainty in the location of these edges. Line 210 represents a reference orientation. The angle between reference orientation 210 and edge 202 corresponds to the amount of skew in the image.

In an alternative embodiment in which bad points are kept in the set of recorded "left" points, the required measure of confidence should be relaxed.

If a sufficient measure of confidence is achieved, SKEW 66 is performed next; otherwise, RIGHT 60 is performed next. The order of processing for the two edges is not critical. In an alternative embodiment, analysis of the scanning data for the "right" edge may be performed prior to or coincident with analysis for the "left" edge.

RIGHT 60 analyzes scanning data and establishes whether any transition in the data represents a "right" edge. In one embodiment, this is accomplished by examining the scanning data from right to left, looking for a transition from black to white. If such a transition is found, the horizontal location of the transition is saved in a set of recorded "right" points.

FIT 62 establishes the best fit of a straight line to the set of recorded "right" points and establishes a measure of confidence in the fit. Refer to the description of FIT 56 above for additional details.

OK 64 inquires whether the measure of confidence in line fit is sufficient to establish the location of the "right" edge. Refer to the description of OK 58 above for additional details. If a sufficient measure of confidence is achieved, SKEW 66 is performed next; otherwise, processing proceeds to EXIT 70.

SKEW 66 calculates the skew angle by establishing the angle between the detected edge and a reference orientation. In preferred embodiments, two mutually orthogonal reference orientations are used so that the skew angle is never more than forty-five degrees. The first reference orientation is parallel to the principal axis of the linear CIS array in optical sensor 2. The second reference orientation is orthogonal to the first reference orientation and parallel to the plane of the page image.

Figure 9A:
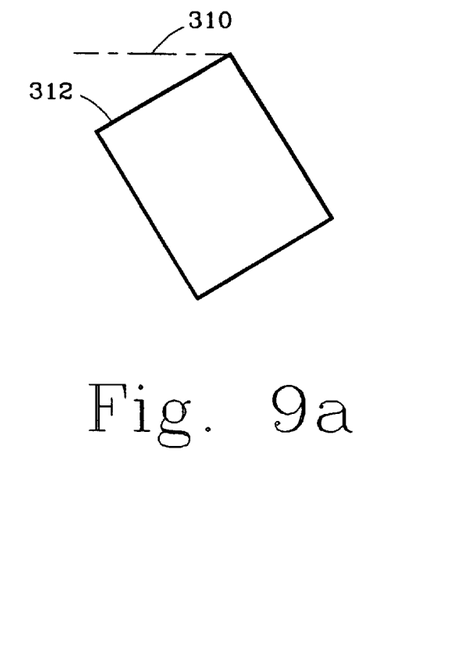
FIGS. 9a–9d are schematic representations of page images having various skew angles.

Referring to FIG. 9a, the angle θ between first reference orientation 310 and "left" edge 312 is approximately 30 degrees. This is the skew angle for this page image. Note that the image must be rotated by −30 degrees to compensate for skew, and that the "left" edge becomes the top edge of the image. The negative angle denotes rotation in a clockwise direction.

Figure 9B:
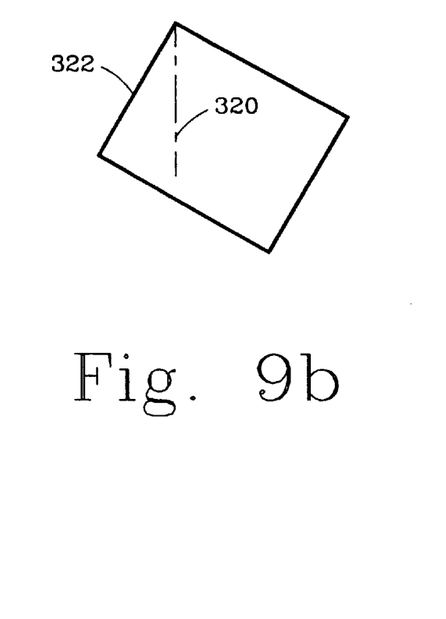

Referring to FIG. 9b, the angle between the first reference orientation, not shown, and "left" edge 322 is approximately sixty degrees. Because this angle is greater than forty-five degrees, the angle θ between second reference orientation 320 and "left" edge 322 is established as the skew angle. A rotation of +30 degrees compensates for skew, and the "left" edge becomes the actual left edge of the image.

Figure 9C:
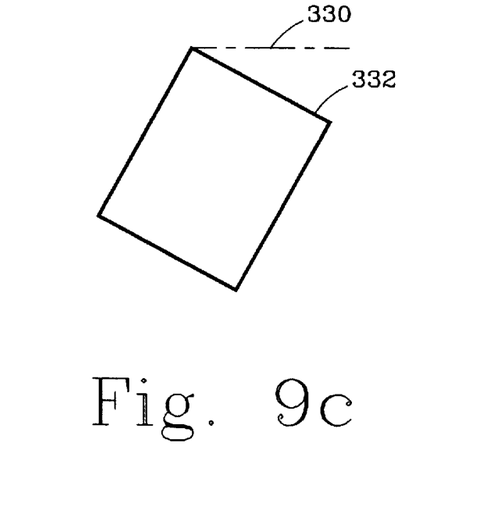

Referring to FIG. 9c, the angle θ between first reference orientation 330 and established "right" edge 332 is approximately 30 degrees. This is the skew angle for this page image. Note that the image must be rotated by +30 degrees to compensate for skew, and that the "right" edge becomes the top edge of the image.

Figure 9D:
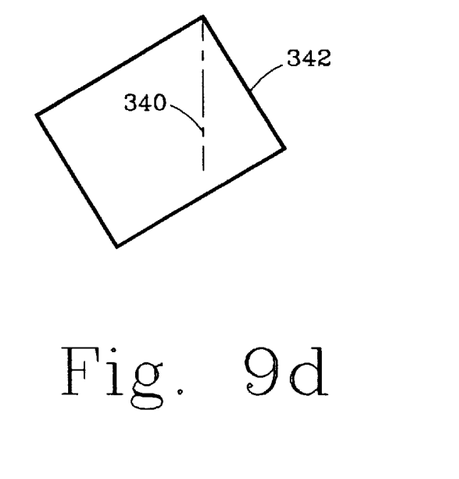

Referring to FIG. 9d, the angle between the first reference orientation, not shown, and "right" edge 342 is approximately sixty degrees. Because this angle is greater than forty-five degrees, the angle θ between second reference orientation 340 and "right" edge 342 is established as the skew angle. A rotation of −30 degrees compensates for skew, and the "right" edge becomes the actual right edge of the image.

Figure 8:
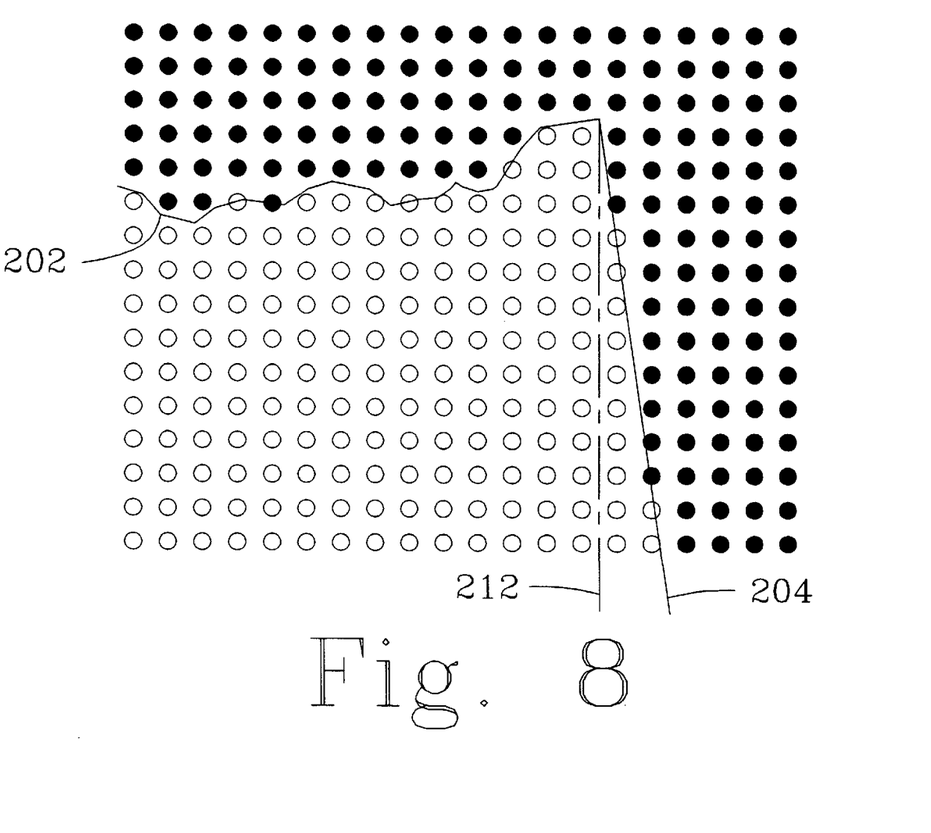

In the preferred embodiment, only one edge is used to calculate the skew angle and the image is subsequently rotated in a manner that aligns that edge with one of two reference orientations. This feature provides two advantages. The first advantage is illustrated in FIG. 8 which provides an enlarged view of a portion of an image. Line 202 represents a ragged edge. Although attempts to fit a straight line to this edge will very likely fail, it is likely that a straight line can be fitted to the pixels marking edge 204. After the angle between the "right" edge and the second reference orientation is established, skew will be compensated correctly by rotating the image in a manner similar to that described above for the example shown in FIG. 9d.

The second advantage arises from the fact that no assumption need be made about the angle between the two edges processed by edge detection. In fact, if the top edge of a rectangular page is aligned with the sensing element, the two edges will be parallel and skew compensation will still function correctly. In this unusual case, the angle between either the "left" edge or the "right" edge and the second reference orientation will be zero. No skew compensation will be applied.

LIMIT 68 sets an indication that the limit position established by LIMIT 26 (see FIG. 3a) has been reached. This effectively prevents EDGE 28 from performing again during the scan of this page.

EXIT 70 terminates this iteration of edge detection and skew angle calculation and returns to allow BUFFER 30 (see FIG. 3a) to perform next.

Image Rotation

An image may be rotated by applying a rotational transform to each pixel. The transformation may be expressed by the rotation equations $$x_2 = (x_1 - x_0) \cdot \cos\theta - (y_1 - y_0) \cdot \sin\theta + x_0 \quad (1)$$

$$y_2 = (x_1 - x_0) \cdot \sin\theta + (y_1 - y_0) \cdot \cos\theta + y_0 \quad (2)$$

where $(x_0, y_0)$=cartesian coordinates of the center of rotation,
$(x_1, y_1)$=cartesian coordinates of a given pixel before rotation,
$(x_2, y_2)$=cartesian coordinates of a given pixel after rotation, and
θ=skew compensation angle.

The rotation may be accomplished by moving each pixel by appropriate horizontal and vertical displacements, but this method requires considerable computational resources.

The horizontal displacement $\Delta x=(x_2-x_1)$ and the vertical displacement $\Delta y=(y_2-y_1)$ for each pixel may be obtained from a pair of displacement equations derived from the rotation equations as follows:

$$\Delta x = (x_1-x_0)\cdot(\cos\theta - 1) - (y_1-y_0)\cdot\sin\theta \quad (3)$$

$$\Delta y = (x_1-x_0)\cdot\sin\theta - (y_1-y_0)\cdot(\cos\theta - 1). \quad (4)$$

In principle the center of rotation may be established at any point but the choice of center can have practical implications in various embodiments. In the preferred embodiment, the center of rotation is established at either the upper right corner of frame 100 (see FIG. 5) for a counter-clockwise rotation if the skew compensation angle is positive, or the upper left corner of frame 100 for a clockwise rotation if the skew compensation angle is negative. This choice ensures that the vertical displacement for all pixels in the image is always less than or equal to zero. An advantage of this result is discussed below.

A number of methods are known in the art which require fewer processing resources than are required to apply either the rotation or the displacement equations above. A method disclosed in U.S. Pat. No. 4,953,230, cited above, shifts vertical columns of pixels within the image representation to correct for skew. Unfortunately, this method will severely distort the image unless the skew angle is very small. A method disclosed in U.S. Pat. No. 5,027,227, cited above, divides the image into areas of pixels and shifts the areas in parallel, both horizontally and vertically, to correct for skew. This method will also severely distort the image unless the skew angle is small.

A preferred rotational technique is a "three-shear" method discussed more fully in a paper by A. W. Paeth entitled "A Fast Algorithm for General Raster Rotation," published in *Graphics Gems*, A. S. Glassner, ed., 1990, pp. 179–195, which is incorporated herein by reference in its entirety. In concept, the first shear moves all pixels in a respective row i horizontally by a distance equal to $\Delta x_i$. After the pixels in all rows are moved, the second shear moves all pixels in a respective column j vertically by a distance equal to $\Delta y_j$. After the pixels in all columns are moved, the third shear moves all pixels in a respective row k horizontally by a distance equal to $\Delta x_k$. The horizontal and vertical displacements for the three shears are calculated from the expressions $$\Delta x = (y_1 - y_0)\frac{\cos\theta - 1}{\sin\theta} \approx -(y_1 - y_0)\cdot\frac{\theta}{2} \quad (5)$$

$$\Delta y = (x_1-x_0)\cdot\sin\theta \approx (x_1-x_0)\cdot\theta \quad (6)$$

where the approximations are valid for small values of $\theta$ expressed in radians.

In the preferred embodiment, ROTATE 34 (see FIG. 3a) does not rotate the entire image at once. Scanning data received before the skew angle is established is stored in the buffer without modification. When the skew angle is established, ROTATE 34 calculates the appropriate vertical displacement $\Delta y_j$ for each column j in the image, and calculates the appropriate horizontal displacement $\Delta x_i$ for each line or row i of scanning data already stored in the buffer. ROTATE 34 applies the first shear to each of the rows already stored. Thereafter, ROTATE 34 calculates the horizontal displacement $\Delta x_i$ for each line or row i of scanning data as it is stored in the buffer and applies the first shear to that row by displacing it horizontally by an amount equal to $\Delta x_i$.

As scanning data is passed from the buffer to a subsequent process, ROTATE 34 delays each column j by an amount corresponding to the respective vertical displacement $\Delta y_j$, effectively applying the second shear, and applies the third shear to the resultant row k by displacing it horizontally by an amount equal to $\Delta x_k$.

This implementation is effective only if the vertical displacement for all pixels is always less than or equal to zero. As mentioned above, the chosen center of rotation ensures that this is true.

This choice of center introduces two other aspects. One aspect is that some pixels within a rotated image will originate from outside the image frame. Referring to FIG. 5, for example, phantom pixels to the right of the right edge and above the top edge of frame 100 will be rotated into the final image. In the preferred embodiment, these pixels will be given characteristics matching those of the scanning background. In an alternative embodiment, these pixels may be given characteristics matching those of neighboring pixels.

The second aspect is that a portion of page image 102 may be rotated beyond the edges of frame 100. Referring to FIG. 9a, for example, suppose the center of rotation lies on line 310 at a point vertically aligned with the upper left corner of the page image. In the embodiment described above, this point also coincides with the upper left corner of the image frame. Skew compensation will rotate a portion of this page image beyond the left edge of the image frame. This can be avoided by using additional memory to extend the boundaries of the image frame, or by ensuring in the optical scanner that the medium does not get too close to the limits of the optical sensing elements.

Alternatives to the preferred rotational technique and implementation may be used without departing from the scope of the present invention.

Alternative Skew Compensation Method

Figure 4A:
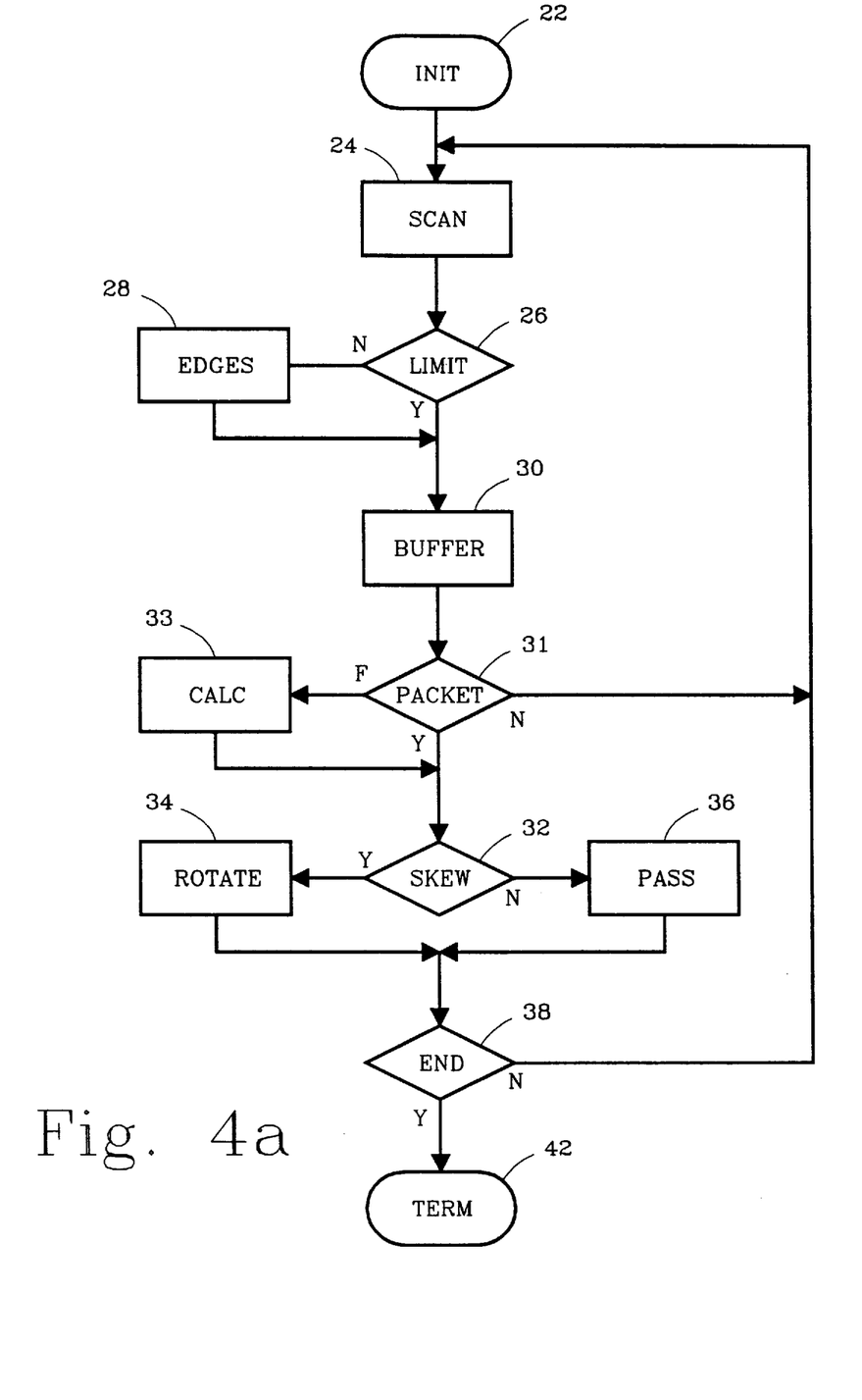
FIG. 4a is a flowchart representing another method of skew compensation according to various aspects of the present invention.
Figure 4B:
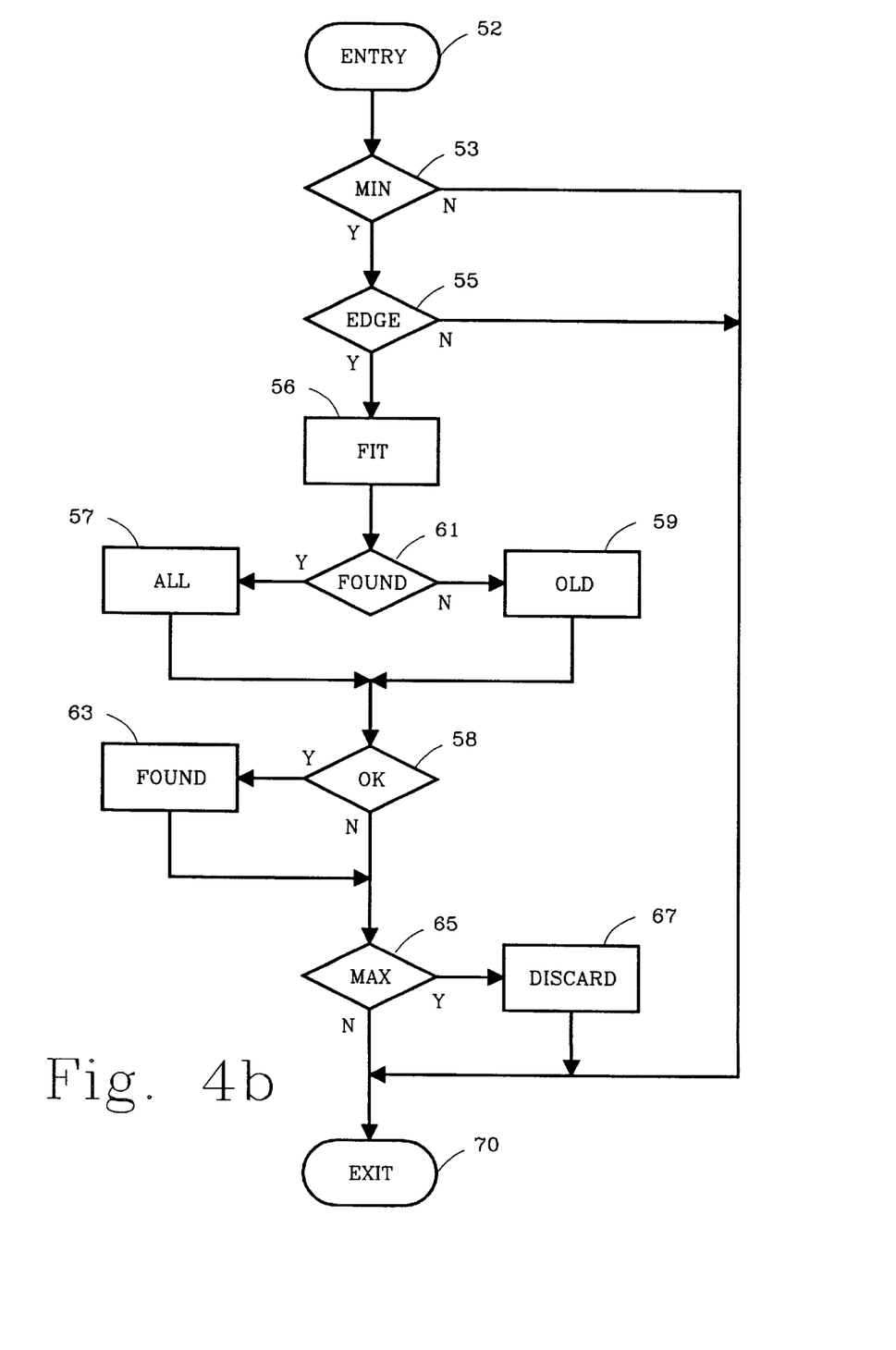
FIG. 4b is a flowchart representing another method of edge detection according to various aspects of the present invention.

The flowcharts in FIGS. 4a–4b illustrate steps in a method which is an alternative to that shown in FIGS. 3a–3b and discussed above. Steps in this alternative method which correspond to steps in the first method discussed above have like reference numbers in the respective figures. A more detailed discussion of these corresponding steps is provided above and is not repeated here.

INIT 22 is substantially similar to that discussed above. This step prepares various elements for the following steps. In particular, for the embodiment discussed below, this includes clearing a buffer of all scanning data and setting indications that a skew angle has not yet been calculated, a scanning limit has not yet been reached, the end of the page has not yet been reached, no scanning "packet" has been formed, and no points in proximity to page edges have been recorded.

SCAN 24 is substantially similar to that discussed above. Preferably, SCAN 24 receives scanning signals from an optical sensor in increments no larger than a "packet," discussed below, so that the amount of memory needed to store the scanning data is reduced. In a preferred embodiment, each increment of scanning data comprises a single line of binary pixels indicating whether corresponding portions of the scanning signal represent "white" or "black" images.

LIMIT 26 establishes a position in the scanning data for a given page after which skew compensation will not be performed if no page edge has been detected. A first "packet" of scanning data is assembled into a buffer while an attempt is made to detect one or more edges of a page image. If at least one edge is detected, the first packet in the buffer and all subsequent packets for this page are modified to compensate for skew. If an edge cannot be detected, the first packet in the buffer and all subsequent packets for this page are passed unaltered to a subsequent process. LIMIT 26 establishes the position in the scan of a given page at which edge detection is abandoned and the packets begin to pass unaltered. In one embodiment using the optical sensor described above, the limit is set at sixty-four scanning lines.

EDGES 28 analyzes scanning data to detect one or more edges of the page. In one embodiment, scanning data is analyzed to detect transitions corresponding to "left" and "right" edges. As described above, one of these edges generally corresponds to the top edge of the page image. Transitions corresponding to each edge may be processed using the method described below and illustrated in FIG. 4*b*.

BUFFER 30 temporarily stores scanning data in the buffer. The size of the buffer required to hold this data is affected by the operation of LIMIT 26 described above and PACKET 31 described below.

PACKET 31 inquires whether enough scanning data has been assembled into the buffer to form a "packet." In one embodiment, a packet constitutes sixty-four scanning lines. If insufficient scanning data has been assembled to form a packet, SCAN 24 is performed again to obtain additional scanning data. When enough scanning data has been assembled to form a packet, CALC 33 is performed next if it is the first packet for this page; otherwise, SKEW 32 is performed next.

CALC 33 is similar to SKEW 66 discussed above. This step calculates the skew angle for this page if at least one edge has been detected; otherwise the skew angle is not calculated. If more than one edge has been detected, the angle is calculated using the edge which is most nearly horizontal. Use of this edge is preferred because it is generally established with greater accuracy. In other embodiments, the edge corresponding to the line fit with the smallest error is chosen for the angle calculation.

In preferred embodiments, the skew angle is reset to zero if the calculated angle exceeds approximately twenty degrees because it is unlikely that the actual skew angle will exceed twenty degrees; therefore such a large angle is more likely the result of error rather than the result of excessive skew.

SKEW 32 inquires whether a skew angle has been successfully calculated for this page. If it has, the packet in the buffer is processed by ROTATE 34; otherwise, the packet is processed by PASS 36.

ROTATE 34 applies a rotational transform to packets of scanning data in the buffer. Rotational transforms are discussed in more detail above. The results of the transform are passed to a subsequent process such as size/shape detector 6.

PASS 36 passes packets of scanning data to a subsequent process without applying a rotational transform.

END 38 inquires whether the end of the scanning data has been reached. If not, SCAN 24 is performed again to obtain additional scanning data.

TERM 42 is substantially similar to that discussed above.

The flowchart in FIG. 4*b* provides additional detail of a method to detect an edge of a page image. Some variations in this method are also discussed below.

ENTRY 52 records one point obtained in response to a line of scanning data which is believed to correspond to a page edge. Unlike the method illustrated in FIG. 3*b* discussed above, the method illustrated in FIG. 4*b* processes points for one edge at a time and is unaware of "left" and "right" edges. In one software embodiment, the logic of FIG. 4*b* is implemented as a subroutine which is invoked once for each point corresponding to either a "left" or a "right" edge. The calling routine obtains points in response to transitions detected in the scanning data and controls the flow of processing for each respective edge.

MIN 53 inquires whether the number of points recorded for the respective edge equals or exceeds a minimum number $N_{MIN}$. If fewer than this minimum number of points has been recorded, it is unlikely that the edge can be established accurately. EXIT 70 is performed next if the number of recorded points is less than $N_{MIN}$. In one embodiment, $N_{MIN}$ is equal to five.

EDGE 55 inquires whether the distance between the first and last recorded points for the respective edge equals or exceeds a threshold distance $D_{MIN}$. If the first and last recorded points span a distance less than this threshold amount, it is unlikely that the edge can be established accurately. EXIT 70 is performed next if the distance is less than $D_{MIN}$. In one embodiment using the optical sensor described above, $D_{MIN}$ is forty-eight pixels which is substantially equal to one-quarter inch.

In one embodiment, the distance $d_k$ between the first recorded point $(x_1, y_1)$ and the kth recorded point $(X_k, Y_k)$ is established from the expression $$d_k = \sqrt{(\Delta x_k)^2 + (\Delta y_k)^2} \quad (7)$$

where $\Delta x_k = |x_1 - x_k|$,
$\Delta y_k = |y_1 - y_k|$, and
$k > 1$.

In another embodiment, the distance $d_k$ is estimated from the expression $$d_k = \mathrm{MAX}(\Delta x_k, \Delta y_k) \quad (8)$$

where $\mathrm{MAX}(i, j)$=the larger of the two arguments i and j.

The estimate obtained from expression 8 may be preferred to the more accurate result obtained from expression 7 in some embodiments because fewer processing resources are required. In either embodiment, EDGE 55 obtains distance $d_k$ and establishes whether $d_k$ equals or exceeds distance $D_{MIN}$. If not, EXIT 70 is performed next; otherwise, FIT 56 is performed next.

In yet another embodiment, the functions of MIN 53 and EDGE 55 may be combined into a single step which ensures that a requisite number of points have been recorded before FIT 56 is performed. This may be accomplished in a number of ways. One way is to calculate the required number of recorded points n from the expression $$n = \mathrm{MIN}\left[\left(m\frac{\Delta y_k}{\Delta x_k} + b\right) \cdot D_{MIN}, N_{MAX}\right]. \quad (9)$$

where m=0.6875,
b=0.1042, and
MIN(i, j)=the smaller of the two arguments i and j.
According to this expression using the indicated coefficients, $N_{MIN}$ (5) recorded points are required for $\Delta y_k / \Delta x_k = 0$, and $N_{MAX}$ (48) recorded points are required for $\Delta y_k / \Delta x_k = 1.303$; $N_{MAX}$ recorded points are required for skew angles greater than approximately 52.5 degrees.

Neither the expressions nor the coefficient values are critical to the practice of the present invention. These expressions are shown to illustrate several ways in which a minimum number of recorded points can be established for those embodiments which require a minimum number of recorded points before attempting to fit a line.

FIT 56 is similar to that discussed above. This step fits a straight line to a set of recorded points associated with the respective edge.

FOUND 61 inquires whether the respective edge has been declared "found." If it has been found, ALL 57 is performed next; otherwise, OLD 59 is performed next.

ALL 57 establishes a measure of error for each recorded point relative to the line fitted by FIT 56. In one embodiment, the measure of error for each recorded point is the distance between the respective point and the fitted line. This distance is obtained from the length of an orthogonal projection from each respective point to the line. Other measures of error including those discussed above may be used in other embodiments.

OLD 59 establishes a measure of error for "old" recorded points relative to the line fitted by FIT 56. "Old" recorded points are all recorded points excluding the latest point recorded by ENTRY 52. This exclusion allows the latest recorded point to influence the line fit until such time as the respective edge is deemed to be "found" by preventing DISCARD 67, discussed below, from discarding it from the set.

OK 58 inquires whether the largest error measure established by either ALL 57 or OLD 59 is less than a margin of error $E_{MAX}$. If the largest error measure is less than the margin, FOUND 63 is performed next; otherwise, MAX 65 is performed next. In one embodiment, the margin of error is 1.2 pixels.

FOUND 63 sets an indication that the respective edge has been found. This indication is tested by FOUND 61, discussed above.

MAX 65 inquires whether the number of points recorded for the respective edge exceeds a maximum number $N_{MAX}$. If the number of recorded points in the set is less than or equal to $N_{MAX}$, EXIT 70 is performed next; otherwise DISCARD 67 is performed to keep the size of the set equal to $N_{MAX}$. By limiting the size of the set, the amount of processing required to fit lines and calculate error measures may also be limited. In one embodiment, $N_{MAX}$ is equal to forty eight.

DISCARD 67 identifies the recorded point which has the largest measure of error and discards it from the set of recorded points.

EXIT 70 terminates this iteration of edge detection.

End of Page Detection

Edge detection processing similar to that discussed above also allows a document imaging system to more accurately detect the end of a document page. This improvement can be important in imaging systems which attempt to turn off the scanner immediately after the end of a page has been scanned.

Many feed-through or roller-type document imaging systems such as fax machines use one or more switches to sense the leading edge of a page to turn on a scanner and to sense the trailing edge of the page to turn off the scanner. In one embodiment, a single switch near the point of page insertion senses both edges. The insertion of a page trips the switch and causes the scanner to be turned on. The switch also senses the passing of the trailing edge and causes the scanner to be turned off after a pre-established interval. Unfortunately, the switch may incorrectly indicate the end of page and cause the scanner to shut off too soon if the page is severely skewed or has an irregular shape.

Referring to FIG. 5, for example, page image 102 represents a page which is skewed counterclockwise. The scanner should not be shut off until the lower left-hand corner of the page has been scanned. A switch located near the right-hand edge of the page will sense the trailing edge before the end of the page passes; therefore, the switch will prematurely indicate the end of the page and possibly cause the scanner to shut off too soon.

The end of a page may be detected more accurately by using additional switches to sense the trailing edge at various points across the width of the page, but each additional switch increases the cost of implementing the imaging system. An imaging system incorporating various aspects of the present invention can accurately detect the end of a page without using additional switches.

In one embodiment, one switch is used to sense both leading and trailing edges. Sensing the leading edge initiates scanning. Sensing the trailing edge initiates a process which detects the end of the page. This process analyzes scanning data and establishes whether any transition in the data represents an edge of the page. If no transition can be found, the process may conclude that the end of the page has passed the optical sensor. Alternatively, the process may require that no transitions be found in some minimum number of scanning lines before an end of page is indicated.

The detection of leading edge and end of page may be combined with automatically initiated document image processing as described in U.S. patent application Ser. No. 07/922,169 filed Jul. 29, 1992, incorporated herein by reference in its entirety. Such a combination can provide for an efficient and convenient way to initiate and terminate document image processing.

Size/Shape Detection

Figure 10:
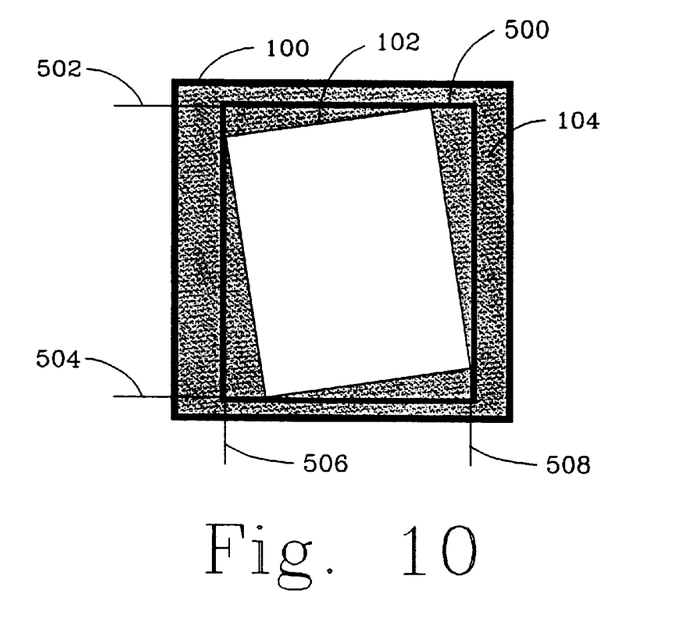
FIGS. 10–11 are hypothetical graphical representations of a page image enclosed within a polygonal approximation of the page edges.

FIG. 10 is a hypothetical graphical representation of a page image. The image within frame 100 comprises page image 102 and area 104 outside the edges of the page image. In many imaging systems, it is desirable to reduce the size of area 104 because it does not convey any information about contents of the page but it increases the amount of space required to store the image. Aspects of the present invention directed toward size/shape detection attempt to minimize this area.

In preferred embodiments, optical sensor 2 (see FIG. 1) scans a page with a black background. A black background is not required, but a background that contrasts with page edges is preferred. If a contrasting background is not used, other methods such as those described above for skew compensation may be used to provide an indication of the edges. For ease of discussion, the following assumes that the image within frame 100 is formed by an optical sensor scanning a white page with a black background. Preferably, a low-pass filtered representation of the image is used to detect edges.

One embodiment of size/shape detection comprises the steps of: (1) establishing points in proximity to the edges of the page image, (2) fitting lines through the points to establish a closed contour which encloses the page image but does not cross any edge, and (3) defining a polygon with sides coincident with the lines in the contour. The polygon is considered to define the size and shape of the page image.

In one implementation, step (2) defines a line along each edge of frame 100 and examines the pixels along the lines. Each line is moved progressively into the image away from the respective frame edge until it encounters an edge of page image 102. When each line has encountered a page image edge, step (3) defines a polygon with sides coincident with the four lines.

FIG. 10 illustrates the results of this process. Lines 502, 504, 506 and 508 are moved away from their respective frame edge until encountering an edge of page image 102. Polygon 500, with sides coincident with the four lines, is considered to define the size and shape of the page image. The polygon can be substantially coincident with the edges of the page image only if each edge of frame 100 is parallel with a respective edge of the page image.

There are a number of ways in which an edge can be detected. One way examines the pixels along a line and concludes that an edge has been encountered if the number of white pixels exceeds a threshold. A second way examines groups of pixels along a line and concludes that an edge has been encountered if any group has a number of "white" pixels which exceeds a threshold. In one particular implementation of this second way, the number of "white" pixels in each 8×8 group of sixty-four pixels just inside the line is compared against a threshold value of fourteen. In this context, it should be understood that a "white" pixel refers to a pixel which deviates significantly from the optical characteristics of the background.

These two ways low-pass filter the image. Other ways may apply a variety of filters including two-dimensional non-recursive filters. One example is a sparse five-tap two dimensional filter with a center tap and four taps in each of the four cardinal directions. Although the choice of filter may have significant impact upon system performance, no particular filter or filtering method is critical to the practice of the present invention. In an embodiment of a document imaging system incorporating aspects of the present invention directed to both skew compensation and size/shape detection, it is also possible to use the same low-pass filtered version of the image for both skew compensation and size/shape detection.

In another implementation which requires considerably more processing resources, step (2) establishes a set of points for each edge. A respective line is fit to each set of points. A point is discarded from a set if the distance between the given point and the respective fitted line exceeds a first threshold. The discarded point is added to an adjacent set of points if the distance between that point and the line fitted to the adjacent set does not exceed a second threshold. A set of points is considered adjacent to the discarded point if it meets three criteria: (1) it is not the set from which the point was just discarded, (2) it contains the closest of all points to the discarded point except for possibly those points in the set from which the point was just discarded, and (3) the distance between this closest point and the discarded point does not exceed a third threshold. If no adjacent set exists, the discarded point is excluded from further consideration. A discarded point will not be added to a given set more than twice.

Figure 11:
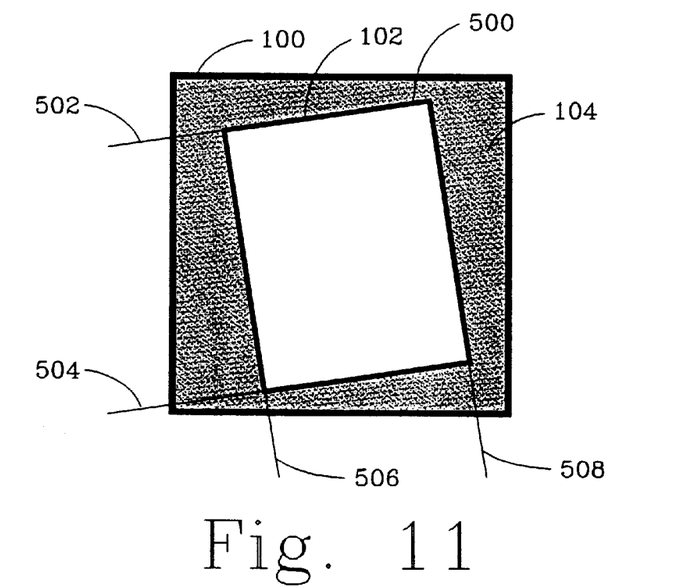

This process continues until a measure of confidence in the fit for each set of points is sufficiently high. FIG. 11 illustrates the results of this process. Lines 502, 504, 506 and 508 are fit to a respective set of points for each edge. Polygon 500, with sides coincident with the four lines, is considered to define the size and shape of the page image. Even though the skew of page image 102 has not been compensated, the polygon is essentially coincident with the edges of the page image.

We claim:

1. A method comprising the acts of:
   optically scanning a medium to generate scanning signals, wherein said medium has a length,
   analyzing said scanning signals to detect one or more edges of said medium prior to scanning the entire length of said medium,
   calculating a skew angle between one of said edges and a reference orientation prior to scanning the entire length of said medium, and
   modifying said scanning signals while scanning said medium to correct for skew.

2. A method according to claim 1 that scans said medium in front of a background provided by a roller having a shade of grey within a range from one hundred percent to about thirty percent.

3. A method according to claim 1 that modifies said scanning signals only if said skew angle is less than about twenty degrees.

4. A method according to claim 1 that analyzes said scanning signals to obtain three or more points in proximity to each of said one or more edges, and establishes one or more fitted lines by fitting each of said lines to three or more of said points, wherein each of said fitted lines corresponds to a respective one of said one or more edges.

5. A method according to claim 4 that establishes two or more fitted lines, establishes a confidence level of fit for each fitted line, selects the edge corresponding to the fitted line having a high confidence level of fit, and calculates said skew angle between said selected edge and said reference orientation.

6. A method according to claim 5 that establishes a confidence level of fit for each of said fitted lines and modifies said scanning signals only if at least one confidence level of fit is sufficiently high.

7. A method according to claim 1 that modifies said scanning signals according to a three-shear technique to effect a rotation, wherein a center of rotation is chosen such that vertical displacements required to effect said rotation are less than or equal to zero.

8. A method according to claim 1 that modifies said scanning signals to effect a rotation about a center of rotation, wherein said center of rotation is chosen such that vertical displacements required to effect said rotation are less than or equal to zero.

9. A document imaging system comprising:
   an optical sensor having an output terminal that conveys scanning signals representing a medium, wherein said medium has a length,
   a computing system coupled to said output terminal and having a processor, wherein said processor analyzes said scanning signals to detect one or more edges of said medium prior to said optical sensor scanning the entire length of said medium, calculates a skew angle between one of said edges and a reference orientation prior to scanning the entire length of said medium, and modifies said scanning signals while said optical sensor scans said medium to correct for skew.

10. A document imaging system according to claim 9 wherein said optical sensor scans said medium in front of a background provided by a roller having a shade of grey within a range from one hundred percent to about thirty percent.

11. A document imaging system according to claim 9 wherein said processor analyzes said scanning signals to obtain three or more points in proximity to each of said one or more edges, and establishes one or more fitted lines by fitting each of said lines to three or more of said points, wherein each of said fitted lines corresponds to a respective one of said one or more edges.

12. A document imaging system according to claim 11 wherein said processor establishes two or more fitted lines, establishes a confidence level of fit for each fitted line, selects the edge corresponding to the fitted line having a high confidence level of fit, and calculates said skew angle between said selected edge and said reference orientation.

13. A document imaging system according to claim 11 where in said processor establishes a confidence level of fit for each of said fitted lines and modifies said scanning signals only if at least one confidence level of fit is sufficiently high.

14. A document imaging system according to claim 9 wherein said processor modifies said scanning signals according to a three-shear technique to effect a rotation, wherein said processor selects a center of rotation such that vertical displacements required to effect said rotation are less than or equal to zero.

15. A document imaging system according to claim 9 wherein said processor modifies said scanning signals to effect a rotation about a center of rotation, wherein said processor selects said center of rotation such that vertical displacements required to effect said rotation are less than or equal to zero.

16. A method comprising:

step for generating scanning signals representing an image of a medium, wherein said medium has a length, step responsive to said scanning signals for detecting one or more edges of said medium prior to generating scanning signals for the entire length of said medium, step responsive to said scanning signals for determining skew between one of said edges and a reference orientation prior to generating scanning signals for the entire length of said medium, and step for correcting said skew while generating said scanning signals.

17. A method according to claim 16 wherein said one or more edges are detected by fitting each of one or more lines to three or more points in proximity to each of said one or more edges, wherein each of said fitted lines corresponds to a respective one of said one or more edges.

18. A method according to claim 17 that fits two or more fitted lines, selects the edge corresponding to the fitted line having a high confidence level of fit, and determines said skew for said selected edge.

19. A method according to claim 18 that corrects said skew only if said confidence level of fit is sufficiently high.

20. A method according to claim 16 that compensates for said skew by effecting a rotation about a center of rotation, wherein said center of rotation is chosen such that vertical displacements required to effect said rotation are less than or equal to zero.

* * * * *